(12) United States Patent
Pajevic et al.

(10) Patent No.: US 10,829,304 B1
(45) Date of Patent: Nov. 10, 2020

(54) MOBILE DRIVE UNIT HAVING A CONVEYOR MODULE

(71) Applicant: Amazon Technologies, Inc., Seattle, WA (US)

(72) Inventors: Dragan Pajevic, Arlington, MA (US); Stephen T. Campbell, Waban, MA (US); Peter Thomas Colantonio, North Andover, MA (US); David William Guerin, Boylston, MA (US); Jude Royston Jonas, Hudson, NH (US); Kevin John Trenholme, Stow, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/508,847

(22) Filed: Jul. 11, 2019

Related U.S. Application Data

(63) Continuation of application No. 15/934,251, filed on Mar. 23, 2018, now Pat. No. 10,549,916.

(51) Int. Cl.
| | |
|---|---|
| *B65G 1/137* | (2006.01) |
| *G05D 1/00* | (2006.01) |
| *B66F 9/06* | (2006.01) |
| *B25J 5/00* | (2006.01) |
| *G05D 1/02* | (2020.01) |
| *B60P 1/64* | (2006.01) |
| *B65G 41/00* | (2006.01) |

(52) U.S. Cl.
CPC ............ *B65G 1/1376* (2013.01); *B25J 5/007* (2013.01); *B60P 1/649* (2013.01); *B66F 9/063* (2013.01); *G05D 1/0088* (2013.01); *G05D 1/0227* (2013.01); *B65G 41/008* (2013.01); *G05D 2201/0216* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,856,642 A | * | 8/1989 | Nicholson ............ | B65G 47/962 198/370.04 |
| 5,676,514 A | * | 10/1997 | Higman ................. | B61B 13/04 198/349 |
| 5,836,436 A | * | 11/1998 | Fortenbery .......... | B65G 11/023 198/370.03 |
| 6,009,992 A | * | 1/2000 | Erceg ................... | B65G 47/962 198/370.04 |

(Continued)

FOREIGN PATENT DOCUMENTS

| | | |
|---|---|---|
| CN | 202093393 U | 12/2011 |
| FR | 3042183 A1 | 4/2017 |
| KR | 10-1793932 B1 | 11/2017 |

OTHER PUBLICATIONS

International Patent Application No. PCT/US2019/023163; Invitation to Pay Add'l Fees; dated Jul. 2, 2019; 14 pages.

(Continued)

*Primary Examiner* — Kyle O Logan
(74) *Attorney, Agent, or Firm* — BakerHostetler

(57) ABSTRACT

A mobile drive unit includes a pivot between the front chassis unit and the rear chassis unit, which both support a support structure that pivotally supports a payload housing. The mobile drive unit can have a sensor and control system.

20 Claims, 8 Drawing Sheets

(56) References Cited

U.S. PATENT DOCUMENTS

| | | | | |
|---|---|---|---|---|
| 6,367,610 | B1* | 4/2002 | Fortenbery | B65G 47/962 |
| | | | | 198/370.03 |
| 7,744,331 | B2* | 6/2010 | Ellis | B62B 5/0026 |
| | | | | 414/476 |
| 9,067,743 | B1* | 6/2015 | Sotelo | B65G 17/12 |
| 9,637,318 | B2 | 5/2017 | Messina | |
| 9,707,879 | B2* | 7/2017 | Mecklinger | B66F 9/063 |
| 2008/0277243 | A1 | 11/2008 | Hayduchok et al. | |
| 2013/0341157 | A1* | 12/2013 | Fortenbery | B65G 17/12 |
| | | | | 198/370.04 |
| 2016/0167888 | A1* | 6/2016 | Messina | B65G 1/0492 |
| | | | | 198/315 |
| 2018/0072212 | A1* | 3/2018 | Alfaro | B60P 1/52 |
| 2018/0305126 | A1* | 10/2018 | Moulin | B65G 1/02 |

OTHER PUBLICATIONS

International Patent Application No. PCT/US2019/023163; Int'l Search Report and the Written Opinion; dated Sep. 27, 2019; 22 pages.

\* cited by examiner

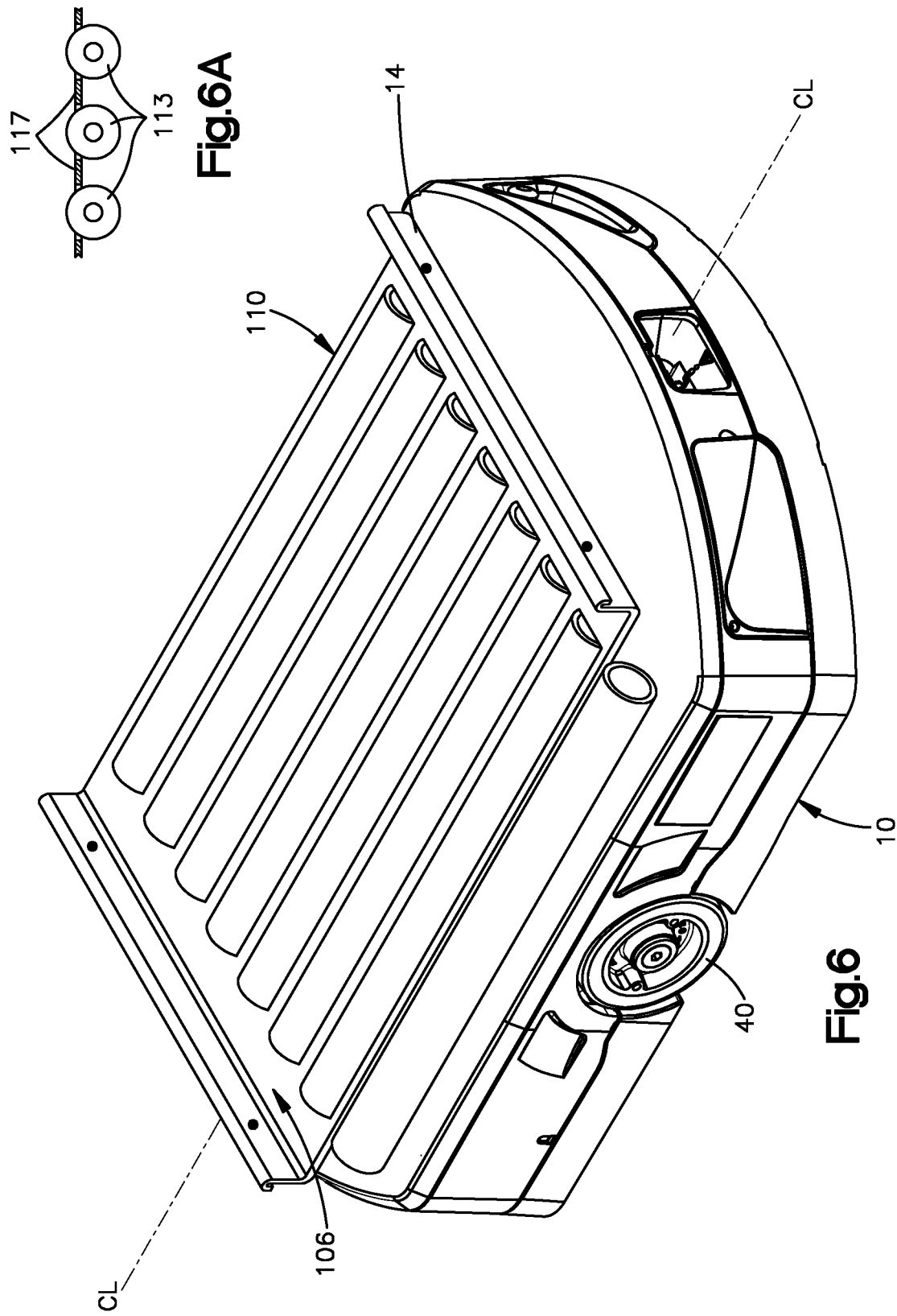

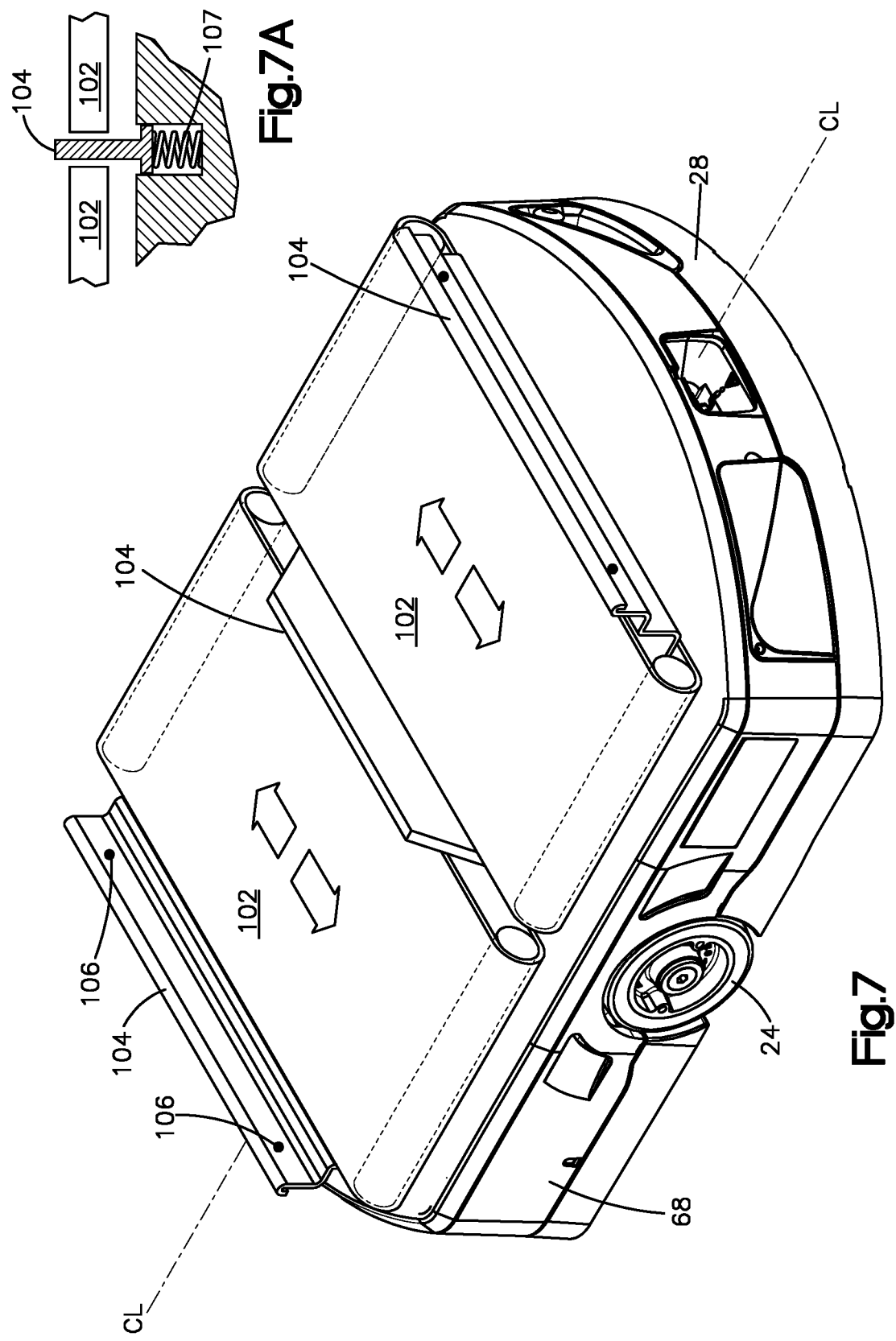

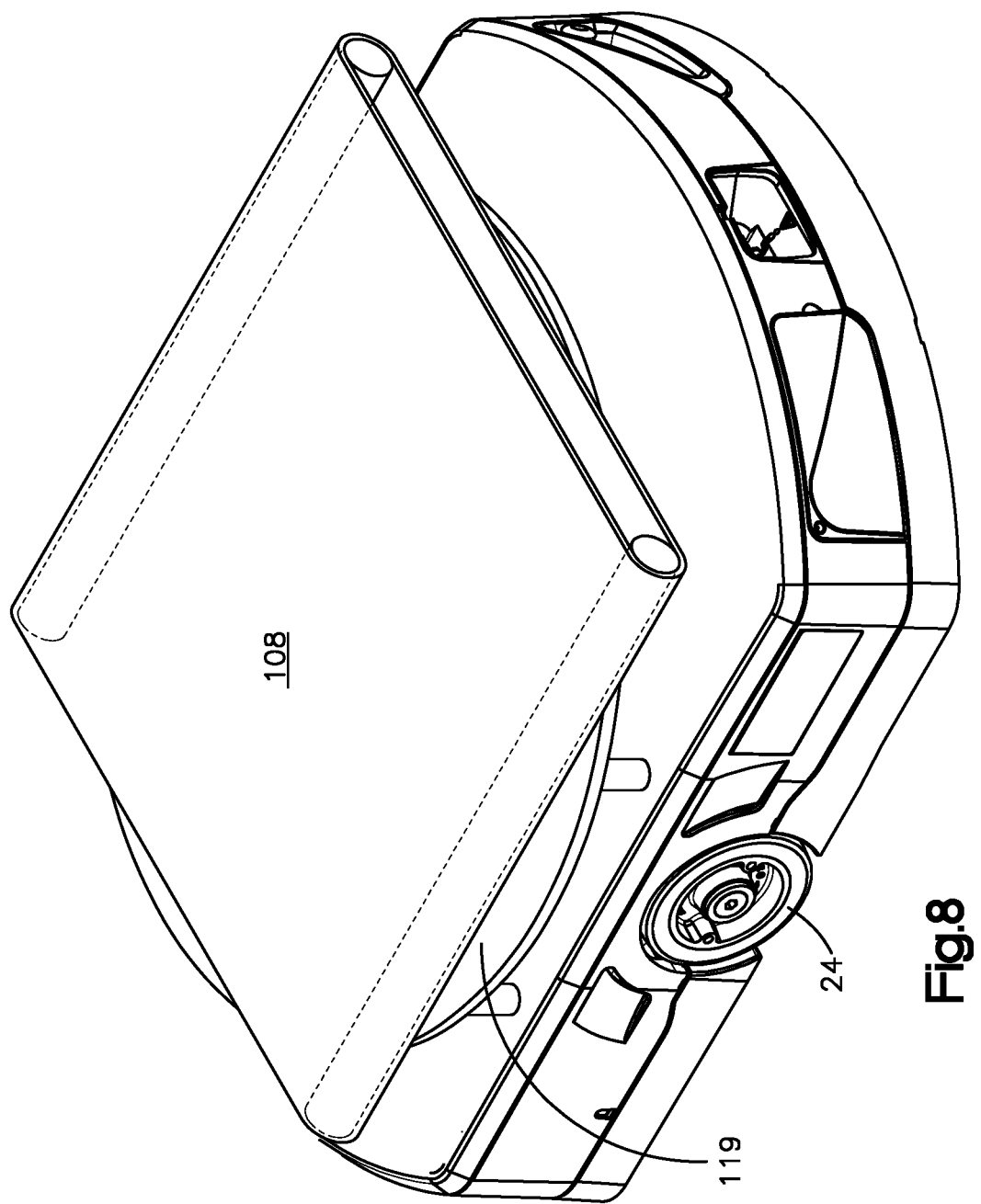

MOBILE DRIVE UNIT HAVING A CONVEYOR MODULE

CROSS-REFERENCE TO RELATED APPLICATIONS

The application claims priority to, and is a continuation of, copending U.S. patent application Ser. No. 15/934,251, filed Mar. 23, 2018, the entirety of which is hereby incorporated by reference.

BACKGROUND

The invention relates to robotic devices and methods, and more particularly to a mobile drive unit for transporting a payload.

Movement of products in a modern warehouse environment, such as a package sort center, in which packages are moved within a facility, occurs on a vast scale. One means to sort packages (i.e., payloads) is to use mobile drive units to deliver packages to destinations designated by the ultimate final destination of the package. For example, mobile drive units can be used to organize packages based on delivery route, as determined based on a postal code or other package features. Mobile drive units are self-powered robotic devices that travel on the floor of the warehouse guided by, for example, fiducial markers in or on the floor.

Mobile drive units may use different mechanisms for loading, transporting, and unloading of payloads. One type of mobile drive unit waits until the payload is placed on or in the mobile drive unit's payload housing. To unload the payload, some mobile drive units use a lifting tray that pivots around one end of the tray to dump the payload, similar to how a dump truck functions.

Being able to monitor the status of payloads during transport, particularly which such payloads are not physically secured to the payload housing, is important. Further, mobile drive units sometimes encounter warehouse concrete floors that have irregularities, such as expansion joints or dips inherent in building process or caused by floor wear or damage.

BRIEF DESCRIPTION OF THE DRAWINGS

FIG. 6 is a perspective view of a mobile drive unit having a powered roller assembly;

FIG. 6A is a detailed view of a portion of the powered roller assembly;

FIG. 7 is a perspective view of a mobile drive unit having three walls;

FIG. 7A is a detailed view of a portion of a spring-loaded wall; and

FIG. 8 is a perspective view of a mobile drive unit having a rotating payload housing.

DETAILED DESCRIPTION OF ILLUSTRATIVE EMBODIMENTS

A mobile drive unit ("MDU") 10 includes a chassis assembly 12 of a vehicle, such as an autonomous or semi-autonomous robot, that supports a payload housing 14, capable of carrying a package (or other payload) in a sort center. The term "payload" is used herein to refer to any item typically moved in commerce, including but not limited to boxes, envelopes (such as jiffy mailers or bubble packs), and the like.

Figure 1:
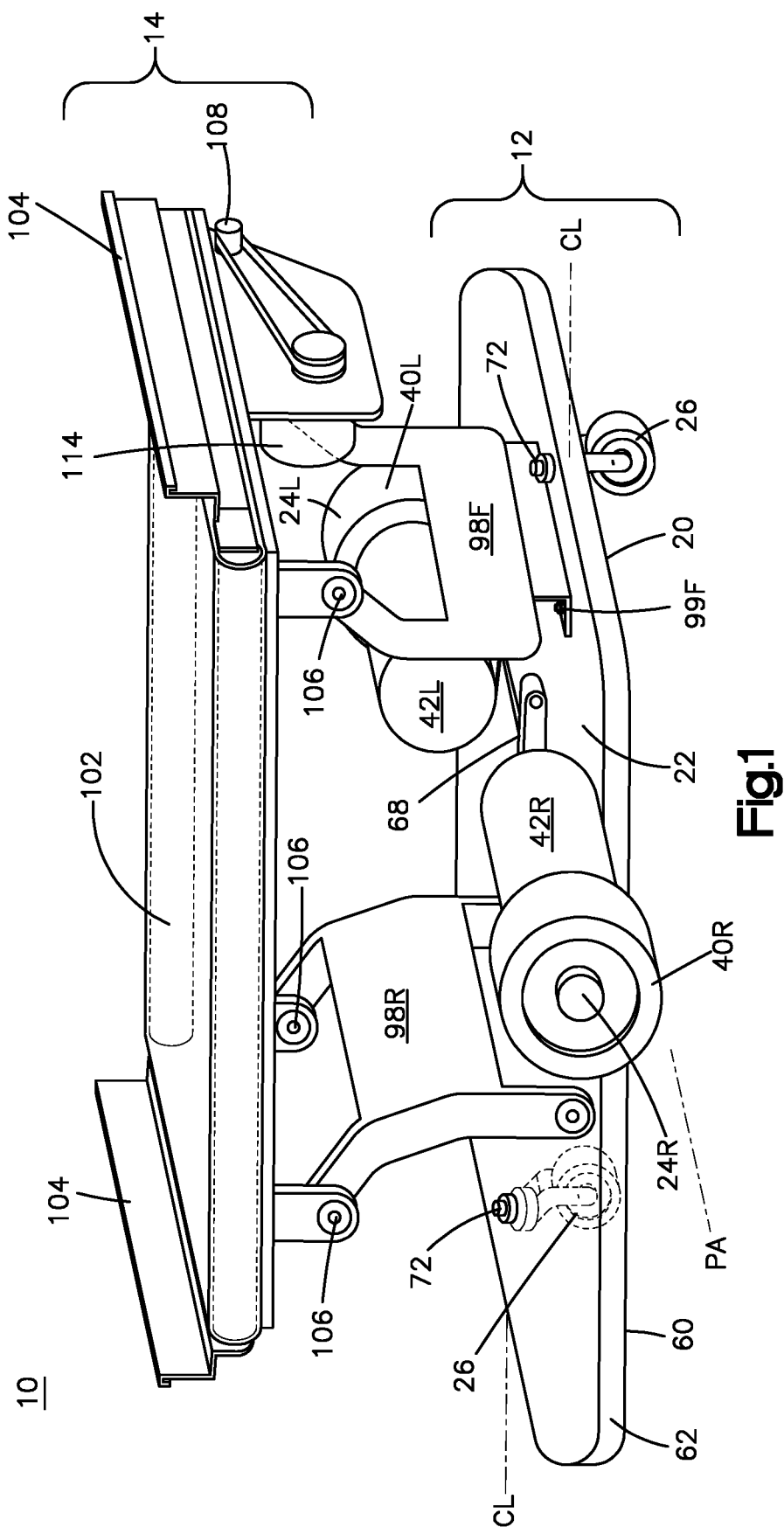
FIG. 1 is a perspective view of a mobile drive unit having a payload housing.
Figure 2:
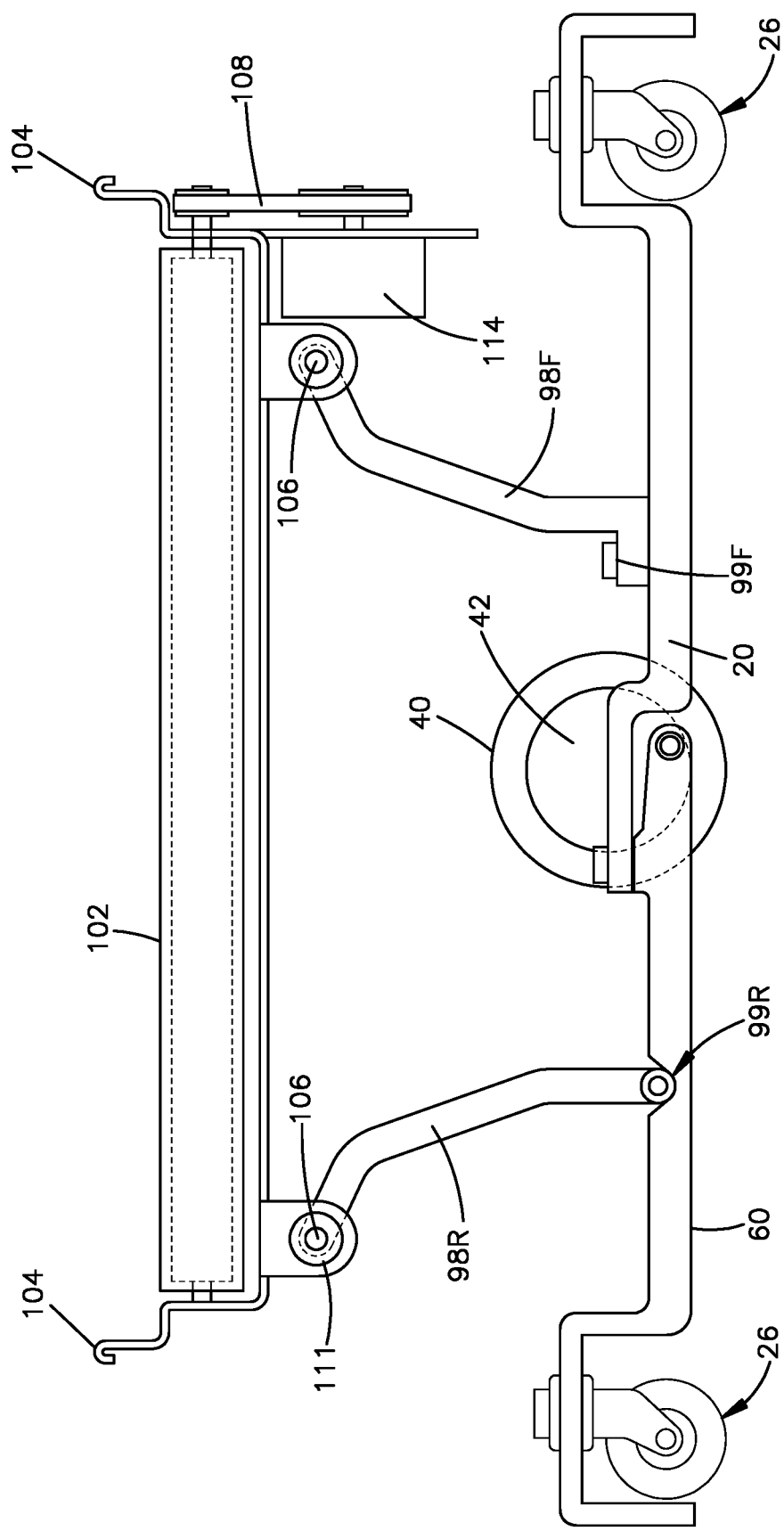
FIG. 2 is a side view of a mobile drive unit having a payload housing.
Figure 3:
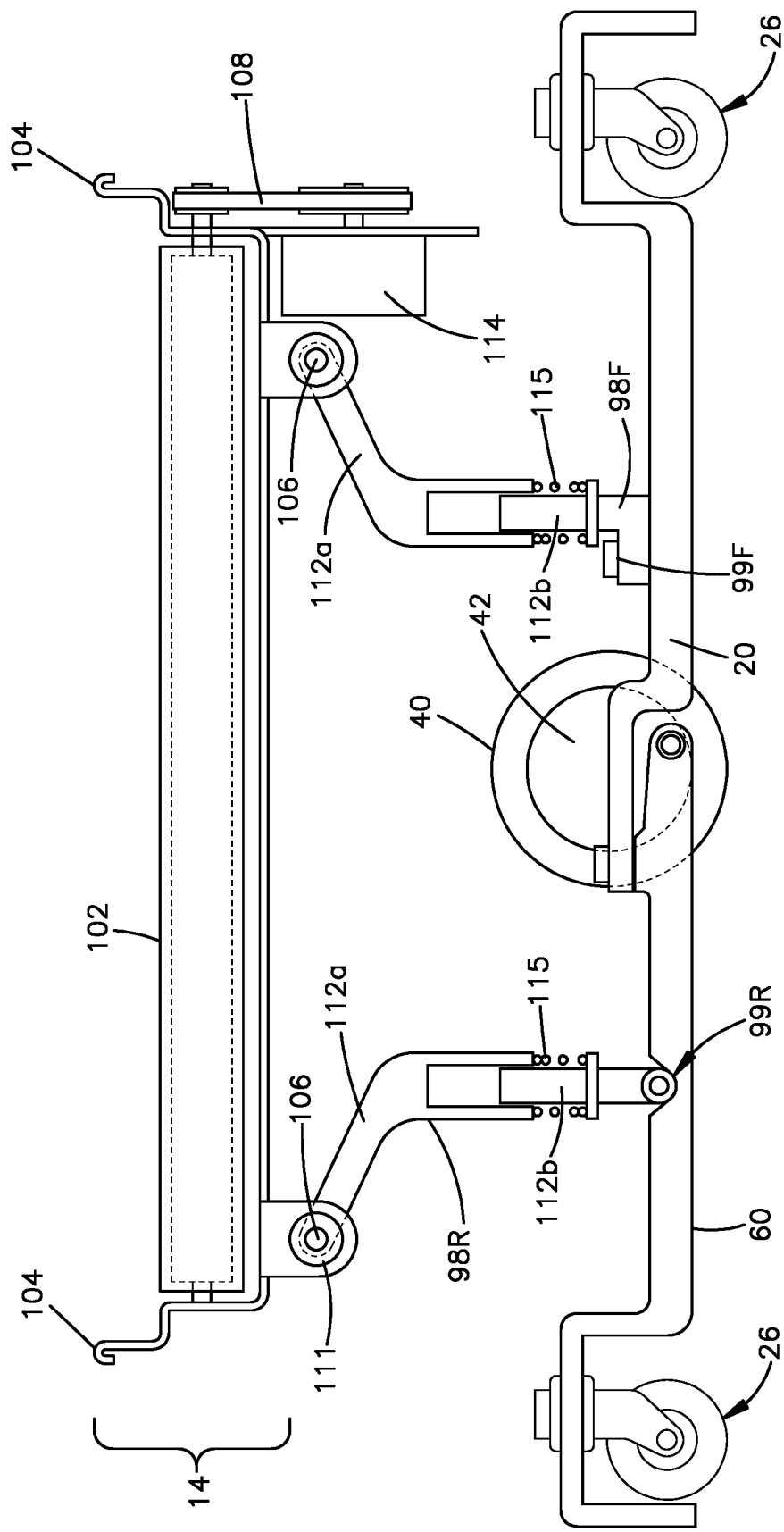
FIG. 3 is a side view of a mobile drive unit having a payload housing.

According to the embodiments shown in FIGS. 1-3, chassis 12 is a split chassis that includes a front chassis unit and a rear chassis unit that are hinged together such that upon encountering a floor irregularity, the front and/or rear chassis can move about a pivot. The pivoting feature of chassis 12 enables the overall height of the mobile drive unit to have a diminished height compared with prior generations of like robots.

Chassis 12 of mobile drive unit 10 includes a first chassis assembly, such as front chassis assembly or unit 20, and a second chassis assembly, such as rear chassis assembly or unit 60. Front chassis assembly 20 includes a base 22, a pair of motorized wheel assemblies 24L and 24R, and a front caster 26. Base 22 in the embodiment shown in the figures is a one-piece aluminum casting to which the wheel assemblies 24L and 24R and front caster 26 are mounted. Base 22 includes mounts and cut outs for receiving the wheel assemblies 24L and 24R, and includes a recess for mounting front caster 26. Base 22 also includes a pair of pivot mounts 70, as explained more fully below.

Rear chassis assembly 60 includes a base 62 and rear caster 66. Base 62 preferably is a one-piece aluminum casting that includes a recess for mounting rear caster 66. Rear chassis assembly 60 includes a pair of forward-extending arms that engage pivot mounts 70 of front base 22. A pair of pins 71 (FIG. 1) link arms to mounts 70 to enable front base 22 and rear base 62 to pivot relative to each other. Pins 71 define a chassis pivot axis PA (FIG. 1) about which bases 22 and 62 pivot or rotate as needed. Axis PA is horizontal and transverse. Axis PA is also perpendicular to a direction of forward motion, which is illustrated in FIG. 1 by line CL, as in the embodiment shown the direction of forward motion is parallel to the centerline CL of MDU 10. Centerline CL bisects the bases 20 and 60 and is equidistant between the drive wheel assemblies 24L and 24R.

Front casters 26 and 66 are mounted to base 22 and 62 (respectively)—the caster shafts extend through the base and are affixed by bolts 72. Preferably, casters 26 and 66 are conventional, and may include double wheels. Casters 26 and 66 freely pivot about the vertical axis through the shafts and are not driven. In the embodiment shown in FIG. 1, casters 26 and 66 are laterally offset from centerline CL. For example, FIG. 1 shows front caster 26 spaced apart from centerline CL to the left and rear caster 26 spaced apart from centerline CL to the right. The offset spacing enables the drive unit 8 to pass over a fiducial marker, such as a bar code or 3D code, in the floor without any of the wheels contacting the marker. Thus, the centerline CL of MDU 10 passes directly over a fiducial marker when the unit 10 drives forward.

Each motor assembly 24L and 24R includes a conventional motor 42L and 42R (as will be understood by persons familiar with mobile drive unit technology) and a drive wheel 40L and 40R, respectively. Wheels 40L and 40R are approximately at the midpoint (fore and aft) of mobile drive unit 10. Each wheel 40L and 40R may be driven according to control signals to move unit 10 forward, or a direction of one of the wheels 40 can be reversed such that the drive unit 10 can rotate in place.

Referring to FIG. 7, mobile drive unit 10 can include a front cover 28 that is affixed to front base 22 and a rear cover 68 that is affixed to rear base 62. Each cover 28 and 68 have a cut-out portion that, with the corresponding cut-outs in bases 22 and 62, forms wheel cut-out that wheels 40L/40R extend through. In this regard, wheels 40L and 40R may extend laterally to the outboard sides of mobile drive unit 10.

Each one of front base 22 and rear base 62 includes a support structure 98 or mounts 99 for mounting a support structure 98, as explained below and shown schematically in FIGS. 1-3.

Support structure 98 may support a payload housing 14. Payload housing 14 can include any structure. Accordingly, support structure 98 may be any configuration and are shown only for illustration, as will be understood and can be implemented by persons familiar with mobile drive unit technology and depending on the particular parameters of the application. Different embodiments of payload housing 14 are discussed in more detail below.

Mounts 99 may have any configuration and supports that connect to mounts 99 may take any configuration, as, generally, mounts 99 encompass (without limitation) pivots and fixed structure. For example, FIGS. 1-3 illustrates embodiments in which front mounts 99F fixedly connect front support structure 98F to unit 22 and rear mounts 99R pivotally connect rear mounts 99R to unit 62. In other embodiments, the front mounts 99F may be pivots and rear mounts may be fixed. Including a pivot mount allows a structure supported by support structure to support the payload while front and rear chassis pivot at mount 70 to enhance the function of the mobile drive unit. For example, pivot mounts at 99 and 70 promote traction of the main drive wheels 40R and 40F when the mobile drive unit encounters a floor irregularity. In this regard, as unit 62 moves over irregularities in the driving surface, pivot mount 99R can adjust accordingly.

As discussed above, it may be desirable to maintain horizontal stability of a top surface 102 of payload housing 14 in spite of relative vertical movement of units 22 and 62 as mobile drive unit 10 traverses uneven surfaces. FIGS. 1-3 illustrate different embodiments of support structures 98 that increase stability of payload housing 14.

FIG. 1 illustrates support structures 98 that are pivotally connected to payload housing 14 via pivots 106. For example, each support structure 98 includes two pivot mounts 106. During use, pivot connections 106 may cooperate with pivot mount 99R to allow support structures 98 to move relative to mobile drive unit 10 and payload housing 14. These pivot mounts 98 do not restrict top surface 102 of payload housing 14 to stay within a plane parallel to either unit 22 or 62. Instead, pivot mounts 98 enable top surface 102 of payload housing 14 to remain horizontally planar, or at least closer to horizontally planar than unit 22 or 62.

Support structure 98 may also include structures for dampening or isolating vibration generated by mobile drive unit 10. For example, the embodiment in FIG. 2 includes a vibration isolator 111 at support structure 98R. Vibration isolator 111 can include any type of passive or active structure for isolating or dampening vibration. As another example, support structure 98 may include one or more dampening springs. The embodiment in FIG. 3 illustrates each support structure 98 as comprising a top support structure 112A connected to a bottom support structure 112B via one or more vertical springs 115.

In some embodiments, different placement of vibration isolator 111 may increase its effectiveness. For example, in some embodiments, including vibration isolator 111 on pivot connection 106, and more particularly on a top pivot connection 106, is more effective for decreasing vibrational forces upon a payload relative to other positions.

As discussed above, support housing 98 supports payload housing 14. Payload housing 14 in turn may support different components for securing, holding, or moving a payload. The payload may reside on top surface 102 of payload housing 14. Payload housing 14 may include one or more walls 104 that rise above top surface 102. For example, FIG. 1 illustrates payload housing 14 with two walls 104, one on each side of payload housing 14. As shown in FIG. 2, these walls 104 may include eyelets at the top. FIG. 7 illustrates payload housing 14 with an additional wall 104 between two conveyor belt assemblies 108. During use, such frames 104 decrease the likelihood that the payload will bounce or slide off of the sides of top surface 102, despite any jolting or vibration caused by uneven drive surfaces. In some embodiments, a controller is used to raise or lower walls 104.

As shown in FIG. 7, walls 104 may be fixed or moveable. FIG. 7A shows wall 104 including a spring 109 that allows wall 104 to raise or lower. This ability to raise or lower may be passive; for example, spring 109 may be compressed by the weight of a package placed on wall 104. As another example, a controller 107 may be used to engage/disengage spring 109. This provides flexibility for payload housing 14 to support payloads of varying shapes and sizes. For example, in some uses, the footprint of the payload may extend beyond the footprint of payload housing 14 itself.

Figure 4:
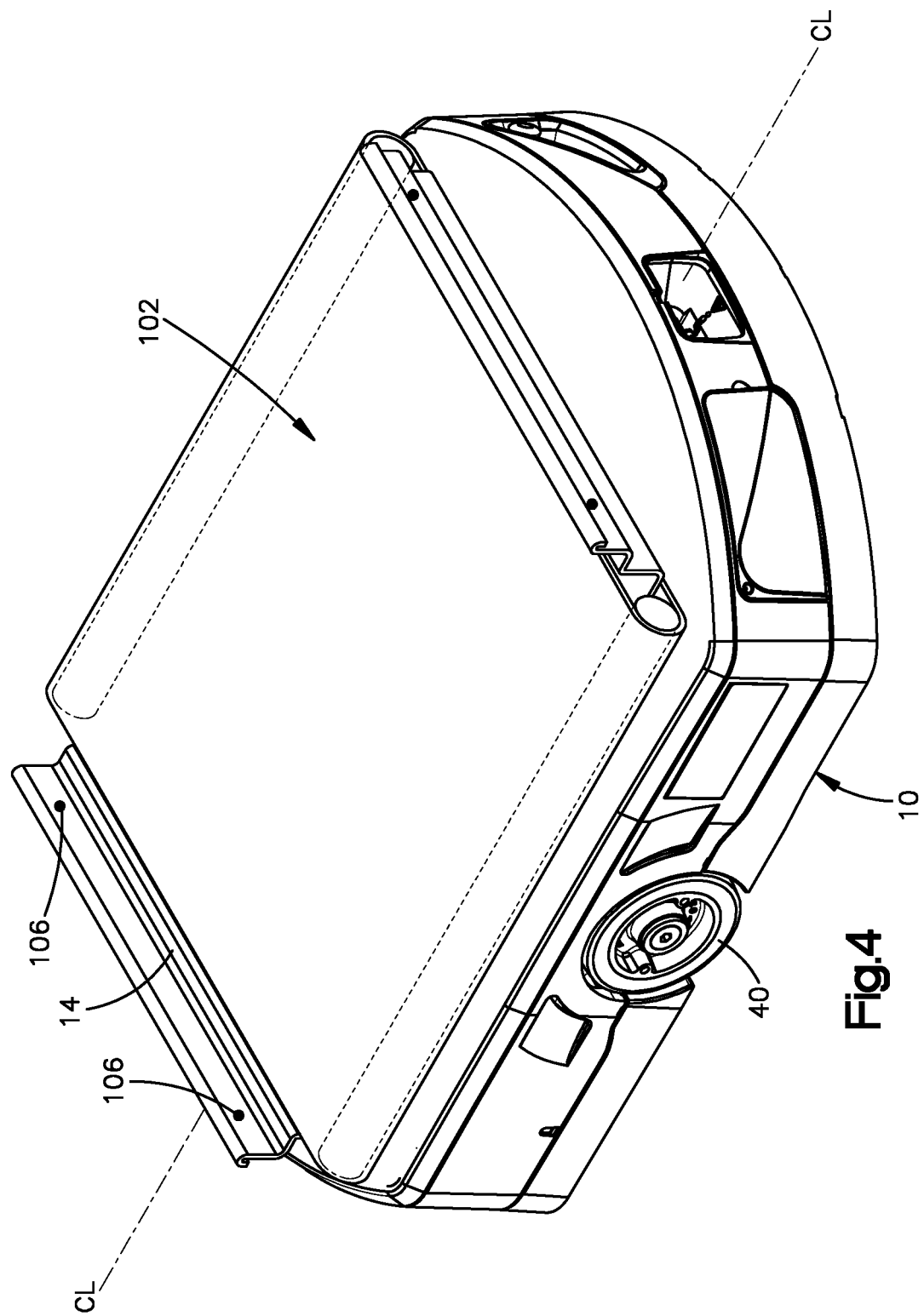
FIG. 4 is a perspective view of a mobile drive unit having a conveyor belt assembly.

In some embodiments, payload housing 14 may include one or more sensors 106 that detect the presence, location, or movement of a payload on top surface 102. For example, such sensors may include pressure sensors integrated into top surface 102. As another example, as shown in FIGS. 4, 6, and 9, motion or distance sensors (e.g., infrared sensors or other light sensors) may be integrated into walls 104. Such sensors 106 may be strategically placed to detect when a payload is at risk of falling off the front or back of top surface 102. For example, while not shown, sensor 106 may be integrated along CL. Additionally or alternatively, as shown, sensors 106 may be integrated within a certain distance from the edge of top surface 102. The sensor information may be used to adjust placement of the payload relative to payload housing 14. This adjustment is discussed in more detail below with respect to different mechanisms for moving the payload.

Payload housing 14 may include mechanisms for loading, unloading, or adjusting the position of a payload on top surface 102. For example, as shown in FIGS. 1-5, payload housing 14 supports a conveyor belt assembly 108. As another example, as shown in FIG. 7, payload housing 14 supports a powered roller assembly 110. While the conveyor belt assembly 108 and powered roller assembly 110 are shown fixedly connected to payload housing 14, as shown in FIGS. 1-8, payload housing 14 may include a turntable upon which conveyor belt assembly 108 or powered roller assembly 110 are installed, such that the conveyor belt assembly 108 or powered roller assembly 110 can rotate on a turntable 119, as shown in FIG. 8.

Figure 5:
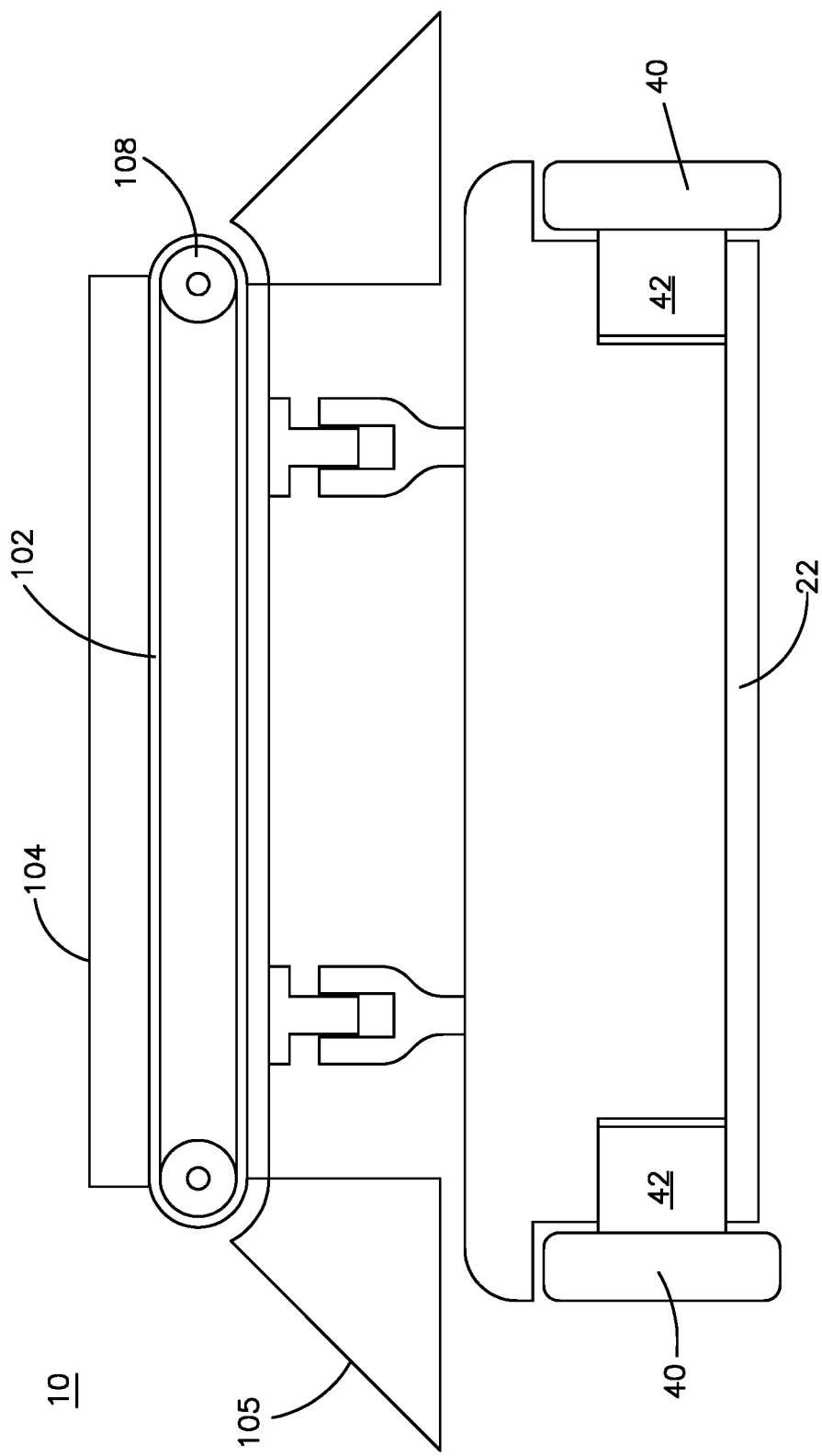
FIG. 5 is a front view of a mobile drive unit having a payload housing that includes ramps.

As another example, payload housing 14 includes one or more ramps 105 at the front and rear of top surface 102 to facilitate onloading and offloading of payloads, as shown in FIG. 5. These ramps 105 can make the transition of the payload from or to a lower surface that top surface 102 smoother, which may be helpful in cases where the payload is fragile.

With reference to FIGS. 1-4, conveyor assembly 108 is discussed in more detail. Conveyor assembly 108 includes a conveyor motor 114 that drives one or more pulleys 116. As shown in FIG. 1, conveyor motor 114 is supported by support structure 98F. In turn, pulleys 116 move belt 118. Conveyor assembly 108 operates to move a payload onto or off of top surface 102. As discussed above, sensors 106 are used in FIG. 4 to monitor the movement of a payload on top surface 102. For example, as mobile drive unit 10 is traveling to an end point, sensors 106 may monitor the location of the payload. In the event the payload moves to close to either end of belt 118, a controller 120 can cause conveyor motor 114 to adjust belt 118. In this manner, conveyor assembly 108 can control placement of a payload.

For example, based on sensor data from sensor 106, controller 120 can determine that a package on the conveyor belt assembly is within a threshold distance from an edge of conveyor belt 118. This threshold may be variable, such as based on the size of the package, such as the relative size of the package to top surface 102F. As another example, the threshold distance may be based on a change in the distance of the package from the edge of conveyor belt 118 during transport. In response to the package coming within the threshold distance of the edge of conveyor belt 118, controller 120 can operate conveyor motor 114 to cause conveyor belt 118 to move the package away from the edge of conveyor belt 118. This process can repeat as the package is jostled during transport.

Referring to FIG. 6, powered roller assembly 110 includes one or more rollers 113 that form top surface 102 on which a payload can be loaded. One or more rollers 113 may be powered by a motor. Powered roller assembly 110 also includes one or more support plates 117 between rollers 113. These support plates 117 may prevent payloads from becoming stuck between rollers 113.

The mobile drive unit includes controllers, cameras and other sensors, a docking port, a turntable, motors to lift and rotate the turntable, and the other components. A person familiar with mobile drive unit technology will understand how to mount and employ the additional components to the front and rear chassis units disclosed herein according to the particular goals and design of the mobile drive unit application.

The present invention has been described by employing a particular embodiment to illustrate particular features. For merely one non-limiting example, components are referred to as front and rear in order to illustrate the structure and function, but the invention is not limited to the particular front and rear orientations unless expressly stated in the claims. Further, the present invention is not limited to any structure or function, nor is the invention limited to any solution to any problem, described herein unless expressly stated in the claims. Nor is the invention limited in any way to embodying a benefit unless expressly stated in the claims. Rather, the structure and function described herein is merely an illustration, and the claims are intended to receive their full scope.

What is claimed is:

1. A mobile drive unit comprising:
   a first chassis unit including a first wheel mounted on a first chassis base;
   a second chassis unit including a second wheel mounted on the second chassis base;
   a pivotal connection between the first chassis base and the second chassis base;
   a first support structure pivotally mounted on the first chassis base;
   a second support structure mounted on the second chassis base;
   a payload housing pivotally mounted on the first support structure and the second support structure; and
   a payload detection sensor mounted on the payload housing.

2. A mobile drive unit comprising:
   a first chassis unit pivotally connected to a second chassis unit;
   a first support structure mounted on a the first chassis unit by a first mount;
   a second support structure mounted on the second chassis unit by a second mount;
   a payload housing pivotally mounted on the first support structure by a third mount and the second support structure by a fourth mount,
   wherein at least two of the first mount, second mount, third mount, and fourth mount are pivotal mounts.

3. The mobile drive unit of claim 2, wherein the pivotal mounts are the second mount, the third mount and the fourth mount.

4. The mobile drive unit of claim 3, wherein the fourth mount includes a vibration isolator.

5. The mobile drive unit of claim 4, wherein the second support structure comprises a bottom support structure connected to a top support structure by a vertical spring.

6. The mobile drive unit of claim 5, wherein the first support structure comprises a second bottom support structure connected to a second top support structure by a second vertical spring.

7. The mobile drive unit of claim 2, further comprising a conveyor belt assembly including a conveyor belt supported by the payload housing.

8. The mobile drive unit of claim 7, wherein the conveyor belt assembly comprises a rotating turntable.

9. The mobile drive unit of claim 7, wherein the payload housing further comprises a plurality of walls.

10. The mobile drive unit of claim 9, wherein at least one of the plurality of walls is a spring-loaded wall.

11. The mobile drive unit of claim 9, wherein at least one of the plurality of walls comprises a sensor for detecting a payload on the conveyor belt.

12. The mobile drive unit of claim 7, wherein the payload housing comprises a ramp located at a front of the conveyor belt.

13. The mobile drive unit of claim 2, further comprising a powered roller assembly supported by the payload housing.

14. The mobile drive unit of claim 13, wherein the powered roller assembly comprises a rotating turntable.

15. The mobile drive unit of claim 13, wherein the payload housing further comprises a plurality of walls.

16. The mobile drive unit of claim 15, wherein at least one of the plurality of walls is a spring-loaded wall.

17. The mobile drive unit of claim 15, wherein at least one of the plurality of walls comprises a sensor for detecting a payload on the powered roller assembly.

18. The mobile drive unit of claim 13, wherein the payload housing comprises a ramp located at a front of the powered roller assembly.

19. A mobile drive unit comprising:
   a chassis unit;
   a support structure mounted on the chassis unit;
   a payload housing mounted on the support structure, the payload housing comprising a top surface;
   a sensor for detecting a package on the top surface of the payload housing;
   a controller communicatively coupled to the sensor; and memory storing instructions that cause the controller to effectuate operations, the operations comprising:

receiving data from the sensor;

based on the data, detecting that the package has moved along the top surface to within a threshold distance of an end of the top surface; and operating a motor to move the package away from the end of top surface, wherein the motor powers at least one of a powered roller assembly or a conveyor belt.

20. The mobile drive unit of claim 19, the operations further comprising: calculating a threshold based on a relative size of the package and the top surface.

\* \* \* \* \*